United States Patent [19]
Brodrick

[11] Patent Number: 5,404,651
[45] Date of Patent: Apr. 11, 1995

[54] CLAPBOARD INSTALLATION LAYOUT GUIDE AND METHOD

[76] Inventor: John H. Brodrick, 30 Bolton Rd., Clinton, Mass. 01510

[21] Appl. No.: 91,169

[22] Filed: Jul. 12, 1993

[51] Int. Cl.⁶ .......................... G01D 21/00; G01B 3/10
[52] U.S. Cl. .......................... 33/646; 33/494; 33/755; 33/759
[58] Field of Search ............. 33/404, 411, 494, 755, 33/758, 759, 760, 646, 647, 648, 649; 52/105, 748

[56] References Cited

U.S. PATENT DOCUMENTS

| | | | |
|---|---|---|---|
| 253,816 | 2/1882 | Clark | 33/648 |
| 1,170,521 | 2/1916 | Faisan | 33/755 |
| 1,521,544 | 12/1924 | King | 33/646 |
| 1,677,821 | 7/1928 | Graham | 33/494 |
| 3,457,649 | 7/1969 | Rodgers | 33/404 |
| 3,662,510 | 5/1972 | Leddy | 52/748 |
| 3,763,609 | 10/1973 | Probst | 52/105 |
| 4,089,141 | 5/1978 | Heroux | 52/105 |
| 4,149,320 | 4/1979 | Troyer et al. | 33/758 |
| 4,266,388 | 5/1981 | Flood | 52/748 |
| 4,708,755 | 11/1987 | Lambelet | 52/105 |
| 4,899,459 | 2/1990 | Taggart | 33/646 |
| 5,056,234 | 10/1991 | Han | 33/759 |

Primary Examiner—William A. Cuchlinski, Jr.
Assistant Examiner—G. Bradley Bennett
Attorney, Agent, or Firm—Iandiorio & Teska

[57] ABSTRACT

A clapboard installation layout guide and method uses an elongate tape having two sets of indicia including a first plurality of "to the weather" indicia spaced apart at intervals approximately equal to the "to the weather" width of the clapboard and a second plurality of indicia including curved tracks with centers at corresponding ones of the first indicia and having a radius approximately equal to the full width of the clapboards; one of the first indicia on the tape is aligned with one boundary of an area to be laid out for installation; with one of the first indicia of the tape aligned with one of the boundaries, the tape is swung so that the first indicia just beyond the other boundary of the area is coincident with the other boundary; clapboards can then be applied to the area so that the upper edge of each of the clapboards is tangent to the successively higher ones of the second indicia until the area is covered including the installation of the starter clapboard of the next area to be covered.

12 Claims, 6 Drawing Sheets

CLAPBOARD INSTALLATION LAYOUT GUIDE AND METHOD

FIELD OF THE INVENTION

This invention relates to an improved clapboard installation layout guide and method.

BACKGROUND OF INVENTION

Installing bevel siding or clapboard on a house typically begins with mounting the starting clapboard on the bottom edge of the house. Then each additional clapboard is mounted above the previous with the lower part exposed ("to the weather") and the upper part covered slightly by the next higher clapboard. This is often done using a "story pole" which is made by marking a board or pole at intervals equal to the "to the weather" width. Then the story pole is held against the house sheathing at a number of places and the marks are transferred right onto the sheathing, to indicate where the bottom of each clapboard should be located. Or the story pole could be offset by the width of the overlap of the clapboard and then marked with the "to the weather" width intervals to enable the top of the clapboards to be the gauge point. When a window is encountered, if the bottom or top of the window does not align with a clapboard edge the clapboard is notched to accommodate the window. This is not only aesthetically unattractive, it also requires extra work in the measuring and cutting and careful handling of the notched clapboards, which increases the time and effort of installation.

If it is desired to install the clapboard so that it aligns neatly to the tops and bottoms of the widows without notching, then typically a measurement is taken from the bottom, starting, clapboard to the bottom of the first row of windows. That measurement is divided by the "to the weather" width which gives the number of clapboards needed to fill that area. The number is usually not a whole number. So that number is rounded off to the nearest whole number and divided into the original measurement to give a new "to the weather" width. This new "to the weather" width is the interval used in that area to set up the story pole which is used as before. This laborious process is repeated for each new area.

SUMMARY OF INVENTION

It is therefore an object of this invention to provide an improved clapboard installation layout guide and method.

It is a further object of this invention to provide such a guide and method which is quicker and easier to use, and more accurate.

It is a further object of this invention to provide such a guide and method which does not require skilled installers.

It is a further object of this invention to provide such a guide and method which requires no arithmetic calculations.

It is a further object of this invention to provide such a guide and method which is inexpensive, easy to position and disposable yet does not interfere with installation or finished appearance.

The invention results from the realization that a truly simple and reliable guide and method for installing clapboard can be effected by using a tape which has a first set of indicia at intervals of "to the weather" width and a second set of curved indicia at intervals of the full width of the clapboards, and swinging the tape so that the minimum number of first indicia are used to produce an interaction with one of the first indicia and each of the boundaries of the installation area. The clapboards can then be installed equally spaced and properly fitting within the boundaries of the area by aligning the tops of the clapboards with the highest or tangent portion of the successive second indicia.

This invention features a clapboard installation layout guide including an elongate tape having two sets of indicia including a first plurality of "to the weather" indicia spaced apart at intervals approximately equal to the "to the weather" width of the clapboard and a second plurality of indicia including curved tracks with centers at corresponding ones of the first indicia and having a radius approximately equal to the full width of the clapboards.

In a preferred embodiment the guide may include a tape which has parallel sides and those sides may be straight. The curved tracks may include continuous lines. The lines may be polygonal or they may be circular arcs. The curved tracks may extend from edge to edge of the tape. The first indicia may be disposed on the longitudinal center line of the tape and they may include straight lines extending from edge to edge of the tape.

The invention also features a clapboard installation layout method including vertically placing against an area to be laid out an elongate tape having two sets of indicia including a first plurality of "to the weather" indicia spaced apart at intervals approximately equal to the "to the weather" width of the clapboard and a second plurality of indicia including curved tracks with centers at corresponding areas of the first indicia and having a radius approximately equal to the full width of the clapboards. One of the first indicia is aligned with one boundary of the area and the tape is swung about that first indicia aligned with the one boundary so that the first indicia just beyond the other boundary of the area becomes coincident with the other boundary. Clapboards are applied to the area so that the upper edge of each of the clapboards is tangent to the successively higher ones of the second indicia until the area is covered including the installation of the starter clapboard of the next area to be covered.

In a preferred embodiment the aligning of one of the indicia may include attaching it to the area to be laid out. The swinging of the tape may include attaching the tape to the area to be laid out with the another of the first indicia coincident with the other boundary.

DISCLOSURE OF PREFERRED EMBODIMENT

Other objects, features and advantages will occur to those skilled in the art from the following description of a preferred embodiment and the accompanying drawings, in which.

Figure 1:
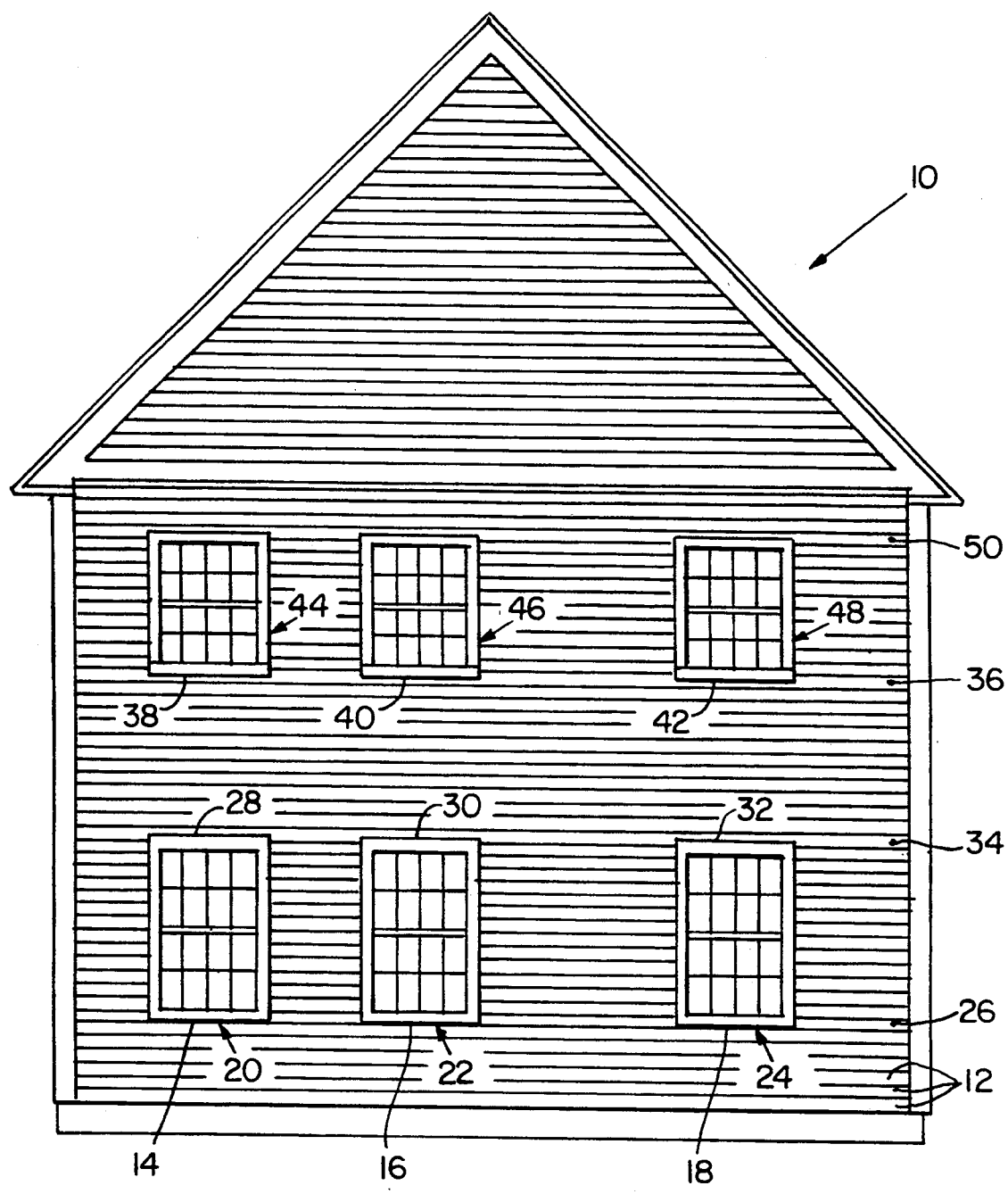
FIG. 1 is a side elevational view of a typical residence where the clapboards must be notched to accommodate window frames.

There is shown in FIG. 1 a side elevational view of a house 10 with a conventional clapboard siding formed of individual clapboards 12. Note that the bases 14, 16 and 18 of windows 20, 22 and 24 align perfectly with the bottom 26 of a clapboard. However, the same is not true for the top frames 28, 30 and 32 which require a slight notching of clapboard 34. The effect is even more pronounced with respect to the notching of clapboard 36 in order to accommodate the bases 38, 40 and 42 of windows 44, 46 and 48. Similar notching is required for clapboard 50 to accommodate the tops of those windows.

Figure 2:
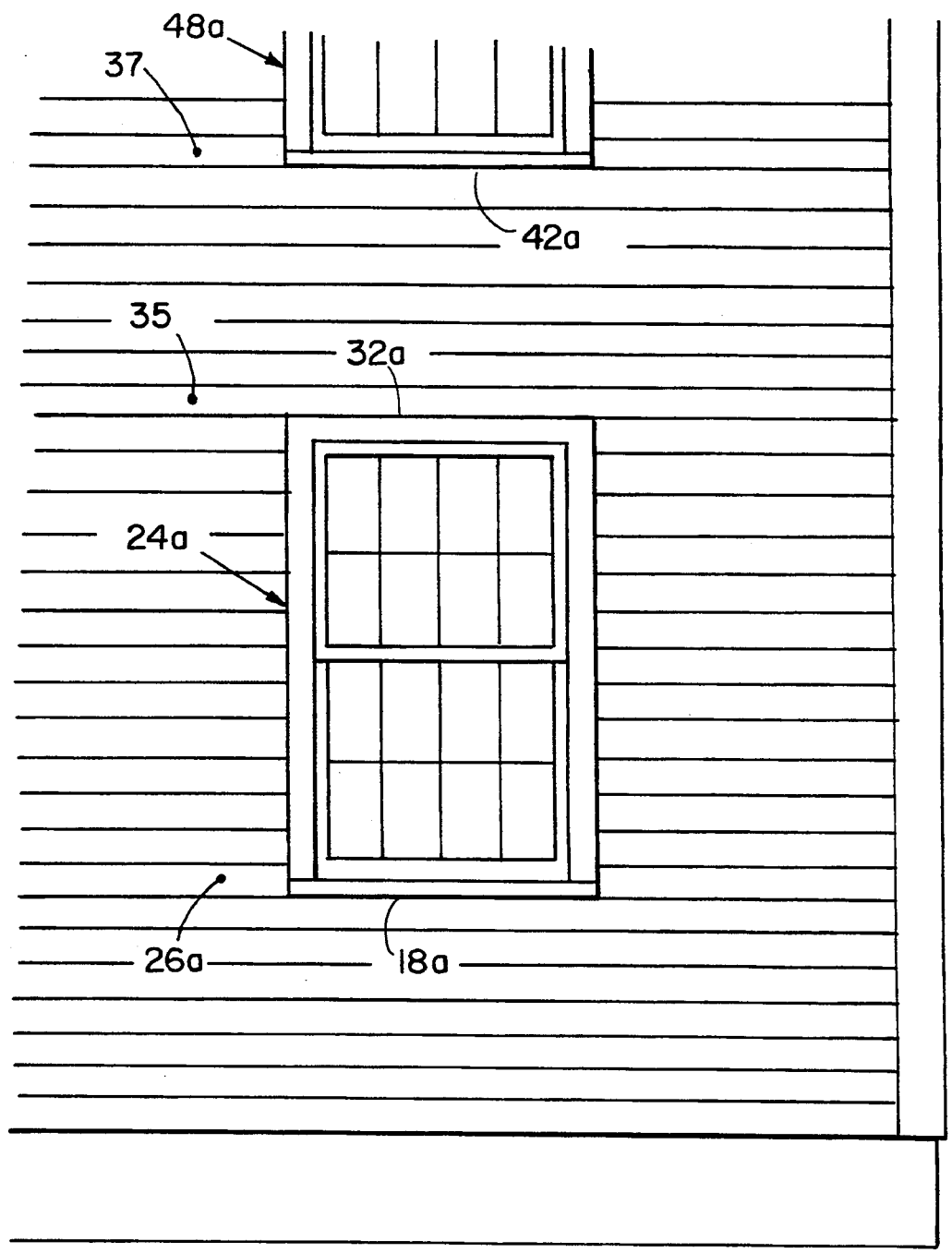
FIG. 2 is an enlarged view similar to FIG. 1 showing clapboard properly spaced about a window frame so that no notching is required.

In addition to requiring extra time and effort to measure and notch the boards and requiring a careful handling of the boards which become more delicate and susceptible to breakage when they are notched, the overall appearance is not to the aesthetic satisfaction of many people. That is, a large number of homeowners and contractors prefer to see the clapboards in alignment with the tops and bottoms of windows as shown in FIG. 2, where window 24a has its top portion 32a fully aligned with the bottom of clapboard 35 and its base 18a fully aligned with the bottom of clapboard 26a. Window 48a also has its base 42a aligned with the base of clapboard 37 in FIG. 2. This neat alignment of clapboards with the window frames can be achieved easily and quickly using the clapboard installation layout guide of this invention, e.g., tape 60, FIG. 3. Tape 60 includes two sets of indicia. The first set of indicia, in the embodiment shown in FIG. 3, includes a plurality of lines 62a, 62b, 62c, 62d, whose separation interval is equal to the "to the weather" dimension of the clapboards when they are installed in a selected area. The second set of indicia include curved tracks 64a, 64b, 64c, whose radius is equivalent to the actual full size dimension of the clapboard. The radius is centered in the embodiment of the tape shown in FIG. 3 along the longitudinal center line 66 of the tape. As indicated by the radii 68a, 68b, 68c. Tape 60 has straight parallel edges 61 and 63.

Figure 4:
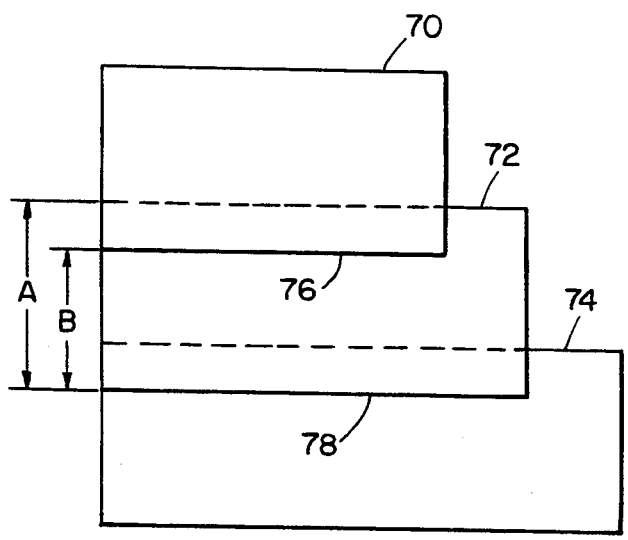
FIG. 4 is a diagrammatic sketch of a portion of installed clapboards showing the full dimension and "to the weather" dimension of the clapboards.

To "to the weather" dimension refers to the width of each clapboard which is exposed to the weather. This is shown graphically in FIG. 4, where there are three clapboards 70, 72 and 74 shown in conventional overlapping relation. The full dimension of board 72 is shown at A. The "to the weather" dimension is shown at B. The "to the weather" dimension of clapboard 72 is defined by the lower edge 76 of clapboard 70 and the lower edge 78 of clapboard 72 itself. The full width dimension is simply the measurement across the full width of clapboard 72.

Figure 5:
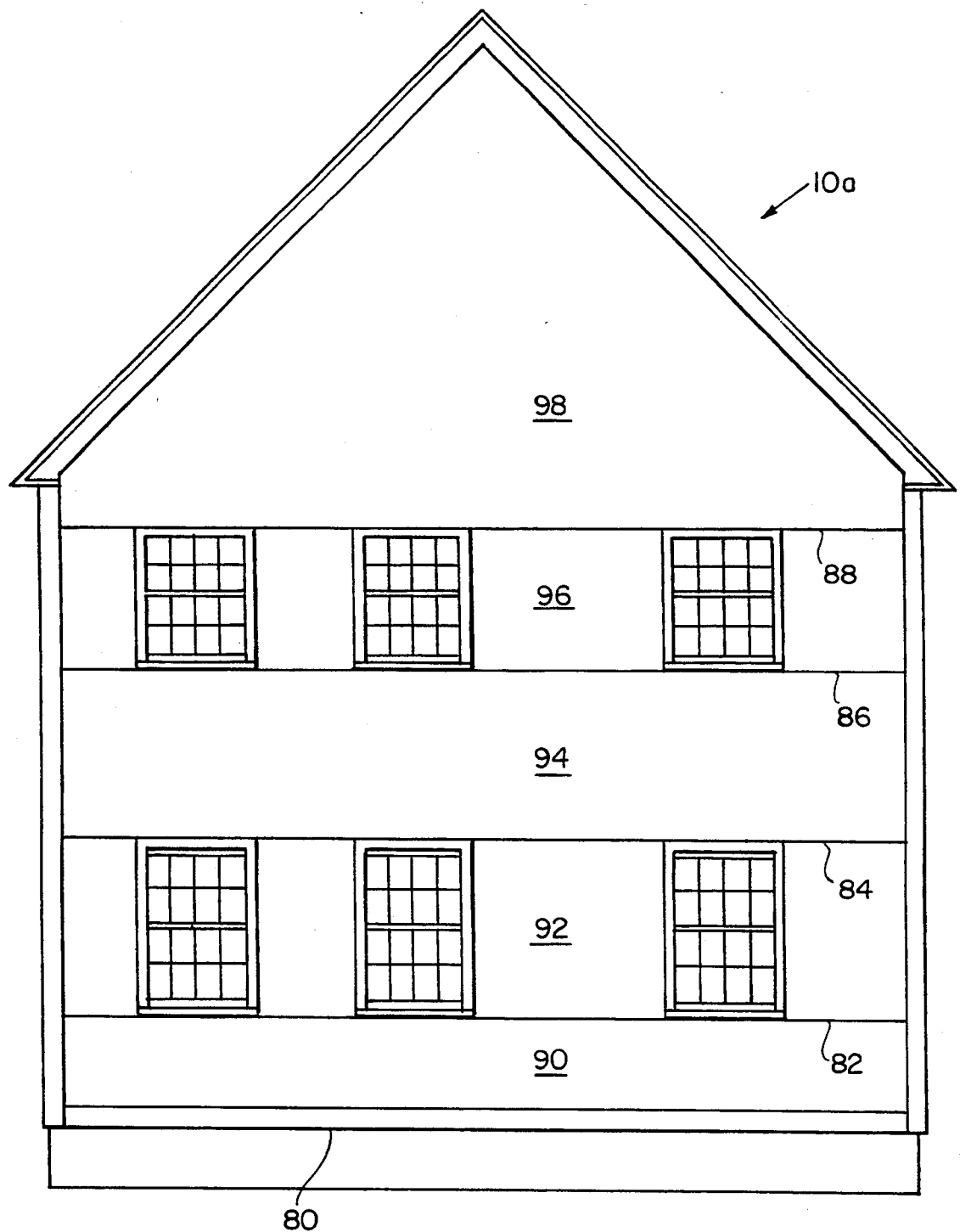
FIG. 5 is a view similar to FIG. 1 showing the sheathing before the clapboard is attached with boundary lines marking installation areas in accordance with this invention.
Figure 6:
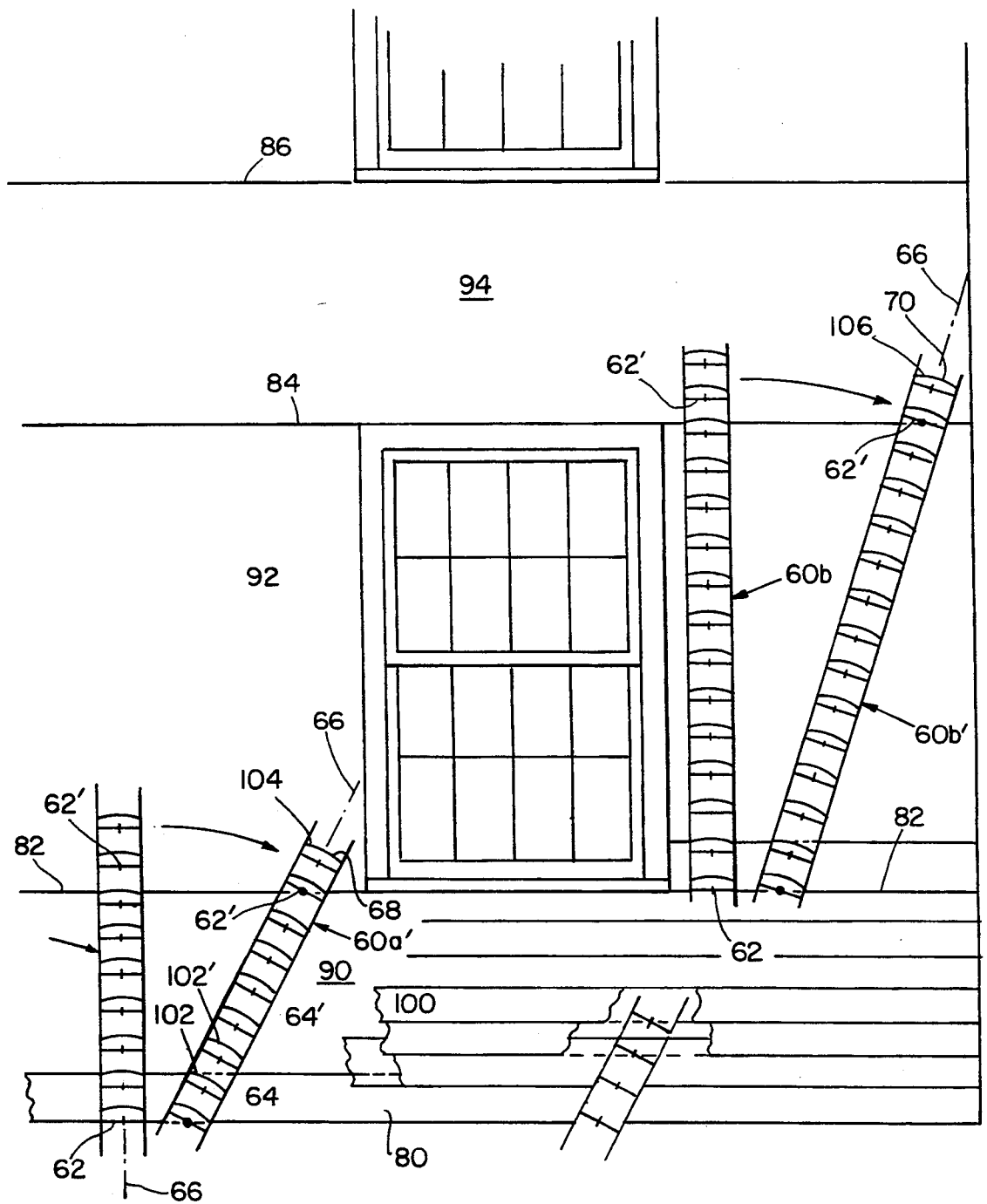
FIG. 6 is a view similar to FIG. 2 with the clapboards partially installed showing the use of the tape guide according to this invention employed in the clapboard installation method according to this invention.

In accordance with the method of this invention, a house 10a, FIG. 5, to be covered with clapboard first has the lowermost clapboard 80 installed on it. Then chalk boundary lines 82, 84, 86 and 88 are snapped coincident with the upper and lower portions of the windows, creating in FIG. 5 five separate contiguous areas 90, 92, 94 and 96 and 98 to be laid out for the installation of the clapboard. The installation of the lowest area 90 is effected as shown in FIG. 6. A piece of tape amply longer than the height of area 90 is oriented vertically across area 90 as shown with respect to tape segment 60a, FIG. 6. One of the first indicia 62 is aligned and preferably rotatably pinned at a point on the indicia 62 coinciding with the longitudinal center line 66 so that indicia 62 aligns with the very bottom of the starter clapboard 80. Tape 60a is then swung, for example to the right, to the position shown at 60a' so that the first one of indicia 62, namely 62', which is beyond the upper boundary line 82 of boundary 90 intersects boundary line 82 with the coincidence of its longitudinal center line 66 and indicia 62'. When this is done, the installation of the clapboards can then proceed without any further measurement or determinations. Each clapboard is simply set so that the top of the clapboard coincides tangentially with the highest part of the curved track of the second indicia 64. For example, the top edge 100 of starter board 80 tangentially intersects the high point 102 of curved track 64. The next clapboard's upper edge will contact the high point 102' of curved track 64'. And so on, until the last clapboard is installed with its base even with the base of the window and its top edge tangentially intersecting the high point 104 of indicia 68 on tape 60a' in FIG. 6. This clapboard then becomes the starter clapboard of the next area 92 in the same manner clapboard 80 was the starter clapboard of area 90.

The next area, area 92, is laid out and covered in the same way. Using another segment of tape 60b, a first indicia 62 is set to align with the base of the last clapboard installed in covering area 90. This final clapboard of area 90 functions as the starter clapboard of area 92 and is in alignment with the window base. The first indicia 62' beyond boundary 84 is noted and the tape is swung to the position as shown at 60b' so that the indicia 62' once again intersects with boundary 84 at its own intersection with longitudinal axis 66. Installation of the clapboard proceeds in the same way in area 92 as it did with respect to installation in area 90.

The final clapboard in area 92 is installed with its base in alignment with the top edge of the window and its top edge tangentially intersecting the high point 106 of indicia 70 on tape 60b'. This clapboard then becomes the starter clapboard for area 94.

To cover an area without windows such as the gable end, area 98, FIG. 5, the tape is held vertically against the wall to be covered with one of the first indicia 62 held at the peak and another first indicia 62 that is the first of such indicia that passes beyond the last clapboard installed in area 96 is located. The tape is rotated so the centerline of indicia 62 on the bottom intersects the base of the last clapboard. The clapboards are then installed in the same manner as in previous areas.

Although in the example shown in FIG. 6 the tape is pinned, this is not a necessary limitation of the invention, as it can be held there by a number of fastening techniques such as adhesives and the like, or by hand. Furthermore, although the tape is swung about its bottom position, this too is not a necessary limitation of the invention as the tape could just as easily be aligned with the upper boundary and then swung from there.

Figure 3:
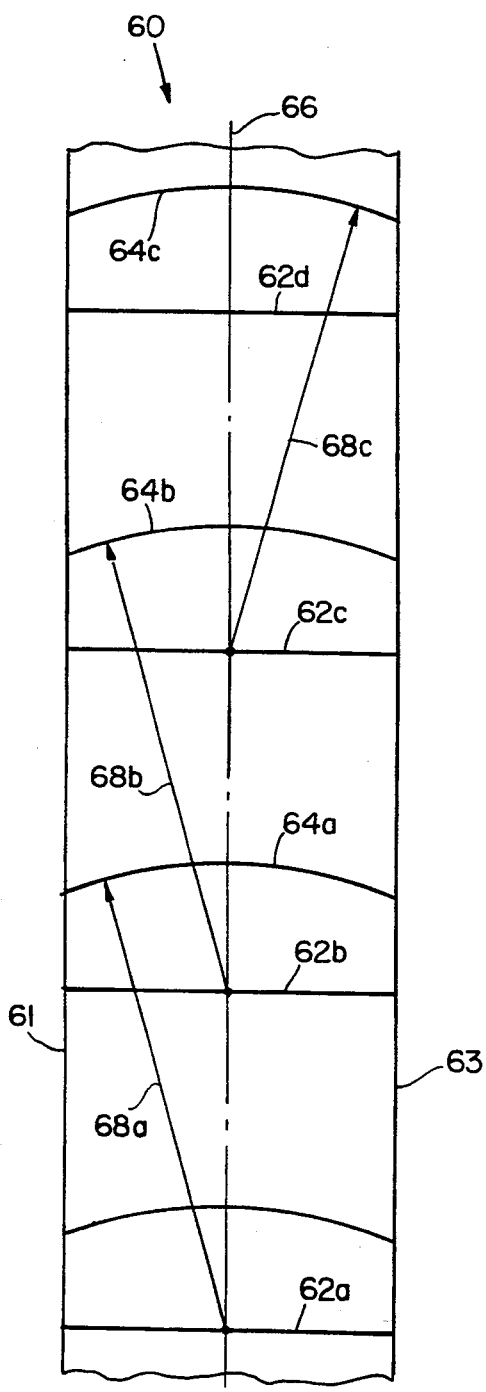
FIG. 3 is a front view of an elongate tape according to this invention.
Figure 7:
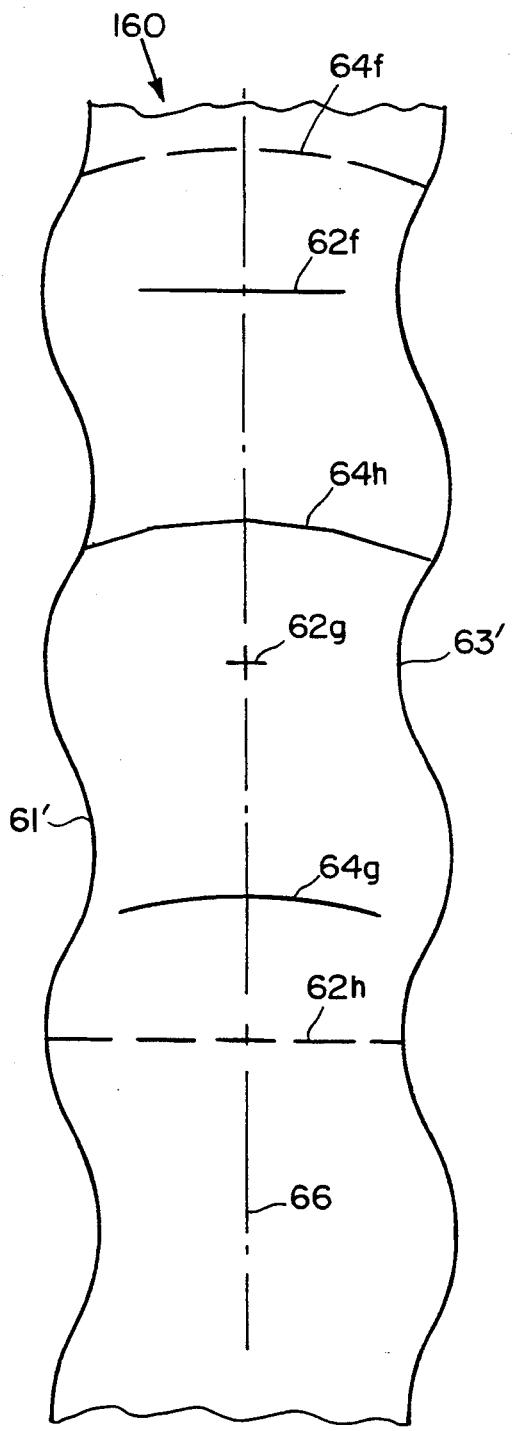
FIG. 7 is a view similar to FIG. 3 showing an alternative construction for the tape guide.

Although the tape is shown as having straight parallel sides 61, 63, FIG. 3, this too is not a necessary limitation of the invention, for as shown in FIG. 7, tape 160 may include sinusoidal regular sides 61' and 63', or may have irregular edges. The first indicia 62 also need not be as shown in FIG. 3. They may be made of line segments 62f, which do not extend to the edges, or they may be simply a point or dot or cross 62g, which mark the interval at the center line 66 of the tape. Indicia 62 may also be for example a broken line as shown at 62h. Any indicia which provides the necessary marking is acceptable. This is also the case with the second set of indicia 64, where as shown in FIG. 7 the curved track may be a broken line 64f, or a line 64g which does not extend to both edges of the tape; further, the curved track may not be the arc of a circle but may approximate it such as shown by the polygonal curve track 64h.

Figure 8:
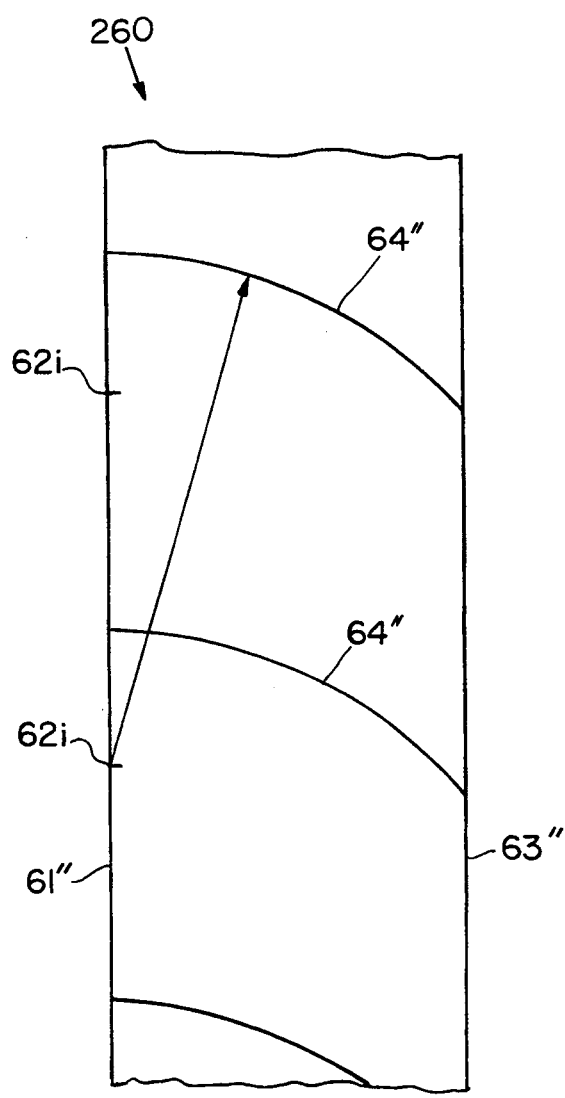
FIG. 8 is a view of another embodiment of the tape guide of FIG. 3 with the centers of the curved paths disposed along an edge of the tape.

In another form, the guide may take the form of tape 260, FIG. 8, wherein the first indicia 62i may be aligned with one edge 61" of the tape and the curve tracks of the second indicia 64" may be only half or partially present. In that case, when tape 260 is swung it would have to be swung to the left about its bottom end as shown in FIG. 8. If rotation in the opposite direction is desired, a tape having the mirror image of the curve track second indicia 64" would have to be used. The mirror image guide could be constructed on a separate or on the back of the same tape so that both options are available using just one tape. Since the tape can be made of paper or other inexpensive and disposable material, the tape is left in place during the clapboard installation, and only portions that may show are removed by tearing or cutting.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A clapboard installation layout guide comprising: an elongated tape having two sets of indicia including a first plurality of "to the weather" indicia spaced apart at intervals approximately equal to the "to the weather" width of the clapboard and a second plurality of indicia including curved tracks with centers at corresponding ones of said first indicia and having a radius approximately equal to the full width of the clapboards.

2. The clapboard installation layout guide of claim 1 in which said tape has parallel sides.

3. The clapboard installation layout guide of claim 1 in which said tape has straight sides.

4. The clapboard installation layout guide of claim 1 in which said curved tracks include continuous lines.

5. The clapboard installation layout guide of claim 1 in which said curved track includes polygonal lines.

6. The clapboard installation layout guide of claim 1 in which said curved track includes circular arcs.

7. The clapboard installation layout guide of claim 1 in which said curved lines extend from edge to edge of said tape.

8. The clapboard installation layout guide of claim 1 in which said first indicia are disposed on the longitudinal center line of the tape.

9. The clapboard installation layout guide of claim 1 in which said first indicia include straight lines extending from edge to edge of the tape.

10. A clapboard installation layout method comprising: placing against an area to be laid out an elongate tape having two sets of indicia including a first plurality of "to the weather" indicia spaced apart at intervals approximately equal to the "to the weather" width of the clapboard and a second plurality of indicia including curved tracks with centers at corresponding ones of said first indicia and having a radius approximately equal to the full width of the clapboards;
   aligning one of said first indicia with one boundary of the area;
   swinging the tape about the first indicia aligned with said one boundary so that another of said first indicia just beyond the other boundary of said area is coincident with said other boundary; and
   applying clapboards to the area so that the upper edge of each clapboard is tangent to successively higher ones of said second indicia until the area is covered including the installation of the starter clapboard of the next area to be covered.

11. The clapboard installation layout method of claim 10 in which aligning one of said first indicia includes attaching it to the area to be laid out.

12. The clapboard installation layout method of claim 10 in which the swinging the tape includes attaching the tape to the area to be laid out with said another of said first indicia coincident with said other boundary.

* * * * *